United States Patent
Jackson et al.

(10) Patent No.: US 10,829,418 B2
(45) Date of Patent: Nov. 10, 2020

(54) METHOD OF DENSIFYING A CERAMIC MATRIX COMPOSITE USING A FILLED TACKIFIER

(71) Applicant: United Technologies Corporation, Farmington, CT (US)

(72) Inventors: R. Wesley Jackson, West Hartford, CT (US); Kathryn S. Read, Marlborough, CT (US); Jeremy R. Hart, Middletown, CT (US); Andrew J. Lazur, Laguna Beach, CA (US)

(73) Assignee: United Technologies Corporation, Farmington, CT (US)

( * ) Notice: Subject to any disclaimer, the term of this patent is extended or adjusted under 35 U.S.C. 154(b) by 103 days.

(21) Appl. No.: 15/823,016

(22) Filed: Nov. 27, 2017

(65) Prior Publication Data
US 2019/0161413 A1 May 30, 2019

(51) Int. Cl.
| C04B 35/638 | (2006.01) |
| C04B 35/589 | (2006.01) |
| C04B 35/80 | (2006.01) |
| C04B 35/634 | (2006.01) |
| C04B 35/628 | (2006.01) |

(Continued)

(52) U.S. Cl.
CPC ............ *C04B 35/589* (2013.01); *C04B 35/532* (2013.01); *C04B 35/6264* (2013.01); *C04B 35/62884* (2013.01); *C04B 35/63416* (2013.01); *C04B 35/806* (2013.01); *C04B 35/563* (2013.01); *C04B 35/565* (2013.01); *C04B 35/571* (2013.01); *C04B 35/638* (2013.01); *C04B 35/63424* (2013.01); *C04B 35/63432* (2013.01); *C04B 35/64* (2013.01); *C04B 2235/3217* (2013.01); *C04B 2235/3244* (2013.01); *C04B 2235/3821* (2013.01); *C04B 2235/3826* (2013.01); *C04B 2235/3873* (2013.01); *C04B 2235/422* (2013.01); *C04B 2235/48* (2013.01); *C04B 2235/483* (2013.01); *C04B 2235/5244* (2013.01); *C04B 2235/5296* (2013.01); *C04B 2235/5427* (2013.01); *C04B 2235/5436* (2013.01);

(Continued)

(58) Field of Classification Search
None
See application file for complete search history.

(56) References Cited

U.S. PATENT DOCUMENTS 5,725,828 A * 3/1998 Zank ............... C03C 14/002
264/624
8,609,558 B2 12/2013 Riehl (Continued)

FOREIGN PATENT DOCUMENTS

CN 106218061 A 12/2016

OTHER PUBLICATIONS

Extended European Search Report for EP Application No. 18207213.2, dated May 8, 2019, 8 pages.

*Primary Examiner* — Richard A Huhn
(74) *Attorney, Agent, or Firm* — Kinney & Lange, P.A.

(57) ABSTRACT

A method of producing an enhanced ceramic matrix composite includes applying a tackifier compound to a fiber preform. The tackifier compound includes inorganic filler particles. The method further includes modifying the tackifier compound such that the inorganic filler particles remain interspersed throughout the fiber preform, and occupy pores of fiber preform.

11 Claims, 2 Drawing Sheets

(51) Int. Cl.
*C04B 35/626* (2006.01)
*C04B 35/532* (2006.01)
C04B 35/565 (2006.01)
C04B 35/563 (2006.01)
C04B 35/64 (2006.01)
C04B 35/571 (2006.01)

(52) U.S. Cl.
CPC .......................... *C04B 2235/5445* (2013.01);
*C04B 2235/614* (2013.01); *C04B 2235/616*
(2013.01); *C04B 2235/77* (2013.01)

(56) References Cited

U.S. PATENT DOCUMENTS

| | | | |
|---|---|---|---|
| 2011/0124256 A1* | 5/2011 | Riehl | C04B 35/589 |
| | | | 442/178 |
| 2011/0200748 A1* | 8/2011 | Eberling-Fux | B82Y 30/00 |
| | | | 427/249.2 |
| 2011/0259506 A1* | 10/2011 | Butler | F27D 1/0009 |
| | | | 156/89.27 |
| 2015/0008613 A1* | 1/2015 | Bouillon | C04B 35/573 |
| | | | 264/232 |
| 2016/0060752 A1 | 3/2016 | Jacques et al. | |
| 2016/0229759 A1* | 8/2016 | Prevost | B32B 18/00 |
| 2017/0015595 A1 | 1/2017 | Weaver et al. | |
| 2017/0044069 A1* | 2/2017 | Harris | C04B 35/64 |
| 2017/0100864 A1 | 4/2017 | Abbott et al. | |

\* cited by examiner

METHOD OF DENSIFYING A CERAMIC MATRIX COMPOSITE USING A FILLED TACKIFIER

BACKGROUND

The present invention relates to the fabrication of ceramic matrix composites and more particularly, to a ceramic matrix composite having improved properties for operating in gas turbine engines.

Ceramic matrix composites may be fabricated using a chemical vapor infiltration process, in which a matrix is deposited on a fiber preform. Deposition occurs more easily on fiber surfaces rather than in open spaces between fibers. Thus, the open spaces remain in the resulting composite structure, which can negatively impact strength and thermal conductivity.

SUMMARY

A method of producing an enhanced ceramic matrix composite includes applying a tackifier compound to a fiber preform. The tackifier compound includes inorganic filler particles. The method further includes heating the tackifier compound such that the inorganic filler particles remain interspersed throughout the fiber preform, and occupy pores of the fiber preform.

An enhanced ceramic matrix composite includes a fiber preform interspersed with inorganic filler particles, and a matrix formed over the fiber preform and the inorganic filler particles. The ceramic matrix composite has a porosity of less than 6%.

DETAILED DESCRIPTION

A method of forming a ceramic matrix composite (hereinafter "CMC") having improved mechanical and thermal properties is disclosed herein. The method includes applying a tackifier compound to a fiber preform made up of one or more fiber plies or other subcomponents. The tackifier compound includes inorganic filler particles that, after a modification step, remain interspersed throughout the structure. The preform can be subjected to subsequent processing steps, such as infiltration with reactant vapors to form a matrix. The inorganic filler particles serve as nucleation sites for the vaporous deposits, thus forming a more uniform matrix with increased resistance to environmental degradation.

Figure 1:
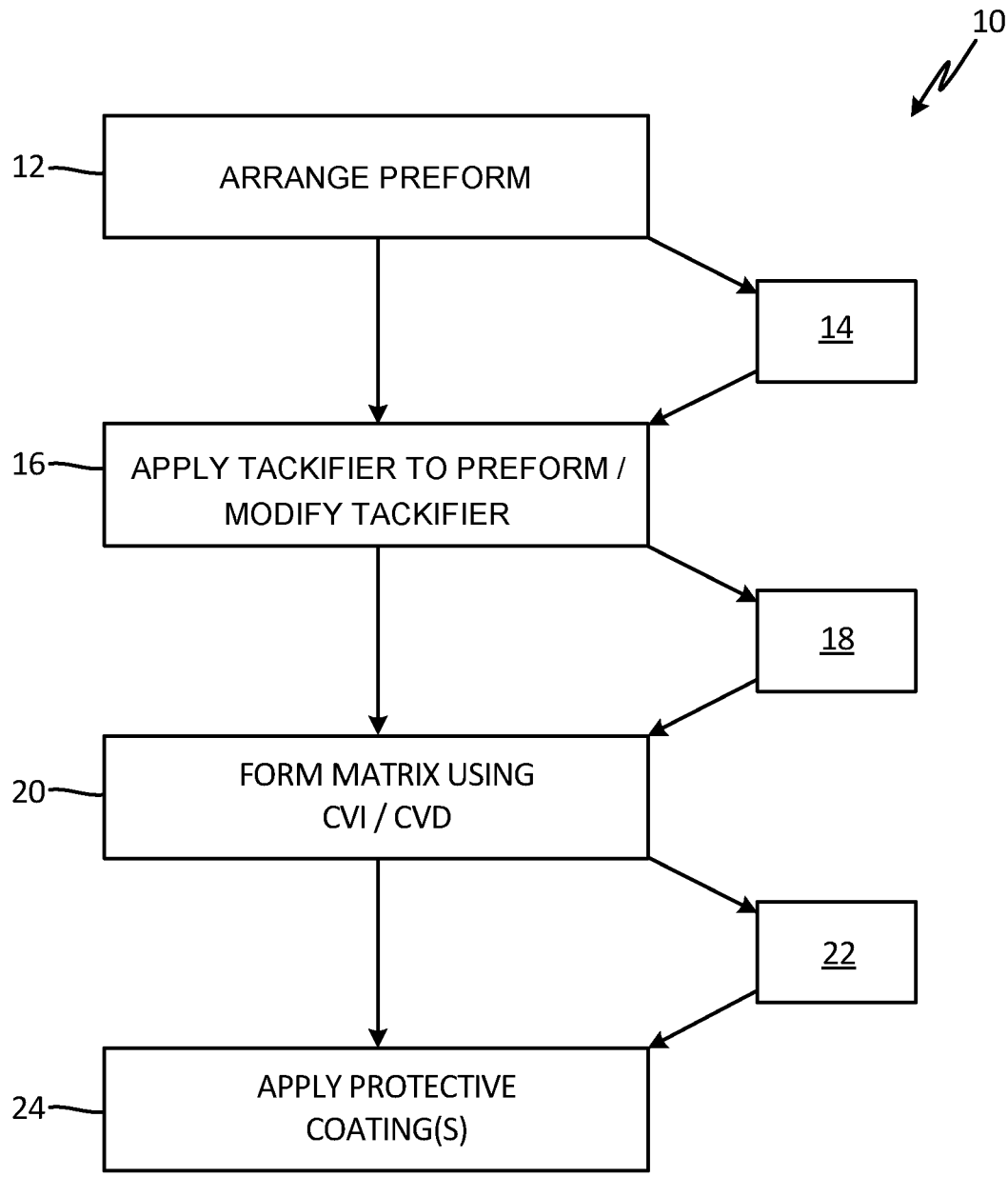
FIG. 1 is a flow chart illustrating a method of forming an enhanced ceramic matrix composite using a tackifier.
Figure 2:
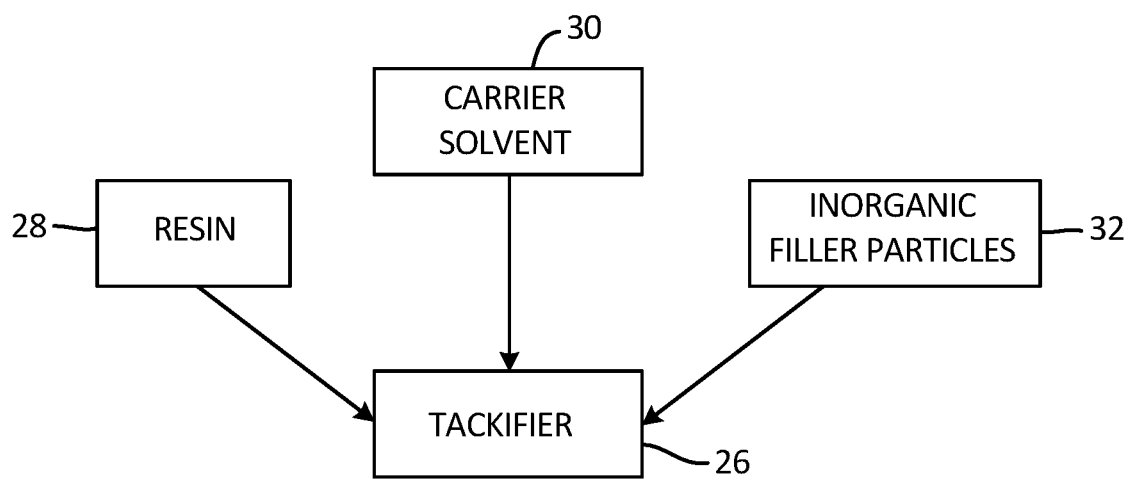
FIG. 2 illustrates the composition of the tackifier.
Figure 3:
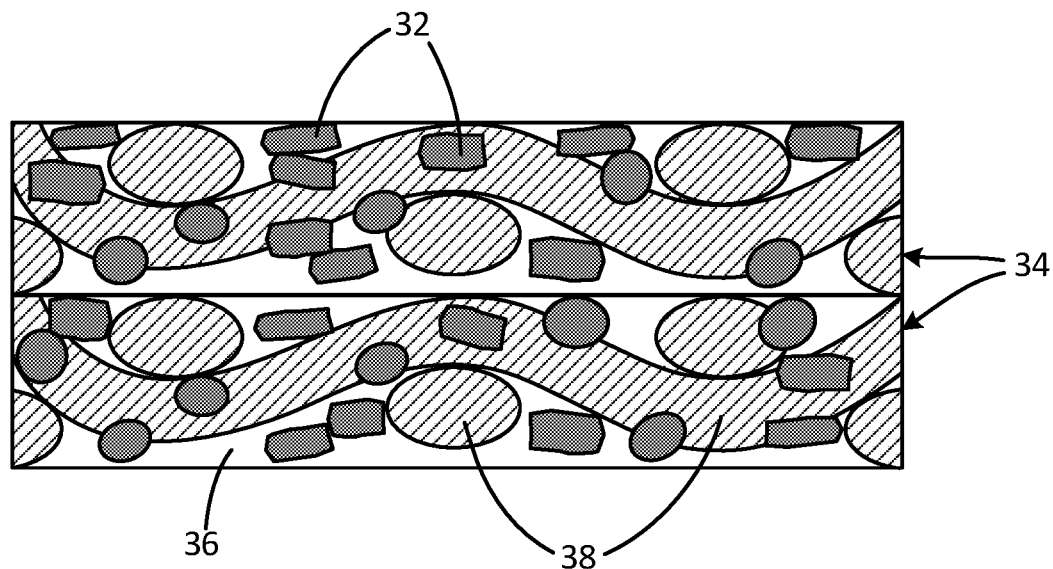
FIG. 3 is a simplified cross-section of an arrangement of fiber plies interspersed with inorganic filler particles.

FIG. 1 is a flow diagram illustrating selected steps of method 10, used to produce an enhanced CMC. FIG. 2 illustrates a tackifier used to produce the enhanced CMC. FIG. 3 is a simplified cross-section showing a preform as an arrangement of fiber plies to which a silicon carbide or other ceramic matrix can be applied. At step 12, a plurality of fiber plies 34 (shown in FIG. 3) are arranged in a desired manner, such as in a stacked arrangement. Plies 34 can be formed from woven and/or non-woven ceramic fibers or tows, which in an exemplary embodiment, can be formed from silicon carbide. Other suitable ceramics are contemplated herein. Plies 34 can further be formed from unidirectional and/or multidirectional (including randomly oriented) fibers. In the embodiment shown in FIG. 3, plies 34 are generally uniform in their design, however, alternative embodiments can include any combination of woven and/or non-woven plies 34, as well as any combination of fiber orientations.

At step 16, tackifier 26 is applied to plies 34. As is shown in FIG. 2, tackifier 26 includes resin 28, carrier solvent 30, and inorganic filler particles 32. Resin 28 can include a polymer-based material, such as polyvinyl-alcohol, polyvinyl-styrene, and polyacrylate, to name a few, non-limiting examples. Carrier solvent 30 can be an organic or inorganic solvent such as water, acetone, ethanol, isopropanol, toluene, or any compound suitable for dissolving resin 28. Filler particles 32 can be, in one embodiment, formed from a stable ceramic material, such as silicon carbide, boron carbide, silicon nitride, pure silicon, pure carbon, aluminum oxide, or hafnia. In another embodiment, filler particles 32 can be formed from a preceramic polymer, such as polycarbosilane, polycarbosiloxane, polycarbosilazane, or polycarbodiimides, which pyrolyze to form a silicon-based ceramic. Other suitable organosilicon compounds are contemplated herein. In yet another embodiment, filler particles 32 can include preceramic polymers which decompose to form non-silicon ceramics (zirconium carbide, hafnium carbide, etc.).

Filler particles 32 are intended to infiltrate plies 34, and more specifically, the open spaces/pores 36 of plies 34. Accordingly, particle dimensions can be tailored to a specific application. The width of filler particles 32 can range from 0.1 micrometer to 500 micrometers, depending on, for example, the size of pores 36 needing to be filled. Filler particles 32 can be spherical particles having an aspect ratio (ratio of particle width to length) of 1. Filler particles 32 can also be elongated particles, such as chopped fibers, having aspect ratios ranging from greater than 1 to 10. In some embodiments, the aspect ratio can be as great as 100. Tackifier 26 can include filler particles 32 having roughly uniform sizes/dimensions, or it can include filler particles 32 having varied sizes/dimensions, based on factors such as the porosity of the individual plies 34, and the arrangement of plies 34 with respect to one another. For example, a mixed tackifier 26 (having more than one type of filler particle 32) can be advantageous in certain embodiments where spherical particles 32 are better suited to fill intra-ply pores 36, while elongated particles 32 are better suited to fill inter-ply gaps.

There are a number of ways to apply tackifier 26 to plies 34. For example, tackifier 26 can be painted or sprayed onto plies 34 as a mixture of each of resin 28, carrier solvent 30, and filler particles 32. A suitable spraying technique can be, for example, a slurry coating technique. The mixture can also be formed as a film adhesive and applied to plies 34. Alternatively, a mixture of resin 28 and carrier solvent 30 can be prepared and applied to plies 34 as described above, while filler particles 32 are subsequently applied over the wet film or mixture. A dip-coating application technique is also contemplated herein. In most cases, plies 34 require only a single application of tackifier 26, however, multiple applications of tackifier 26 can be carried out if necessary.

Step 16 further includes modifying tackifier 26 after it is applied to plies 34, such that filler particles 32 remain associated with plies 34. The modification step can include a thermal and/or chemical decomposition technique, such as pyrolysis, dissolution, or calcination. For example, in embodiments having ceramic filler particles 32, pyrolysis can be used to burn off resin 28 and carrier solvent 30 to leave behind the ceramic particles. In embodiments having preceramic polymer filler particles 32, pyrolysis can be used to burn off resin 28 and carrier solvent 30, and also to decompose the preceramic polymer to a ceramic material. FIG. 3 illustrates plies 34 after the modification step with filler particles 32 remaining attached to fiber tows 38 and in pores 36 of plies 34. It is further envisioned that depending on the composition of tackifier 26, alternative modification techniques can be used without departing from the scope of the present invention. Such techniques can include one or a combination of crosslinking, heating, drying, exposure to radiation, applying a vacuum, and more.

At step 20, plies 34 undergo matrix formation and densification using a chemical vapor infiltration or deposition (CVI or CVD) process. Plies 34 are infiltrated by reactant vapors, and a gaseous precursor deposits on the fiber tows 38 and filler particles 32. Filler particles 32, disposed along all surfaces of the fiber tows 38 and within pores 36, act as nucleation sites for the gaseous precursor, thus allowing for a more uniform distribution of a matrix within plies 34. Vapor infiltration is carried out until the resulting CMC has reached the desired residual porosity. CMCs formed using method 10 can have a residual porosity below 10%, and in some embodiments, as low as 3-5%.

At step 24, additional coatings can be applied to the CMC. For example, one or more protective coatings, such an environmental and/or thermal barrier coatings, can be applied. A bond coat can also be applied to facilitate bonding between the CMC and protective coating. Other protective coatings, especially those suitable for use in a gas turbine engine environment, are contemplated herein.

Method 10 further includes optional, intermediate steps 14, 18, and 22, which can be performed variously between steps 12, 16, 20, and 24. For example, step 14 can be a fiber coating step during which an interface coating is applied to fiber plies 34 using chemical vapor infiltration. Step 14 can additionally or alternatively include a preforming/shaping step, as well an initial round of matrix formation and densification using chemical vapor infiltration. Depending on the process performed at step 14, step 18 can be any of preforming, interface coating, secondary matrix formation, or machining. Machining can additionally or alternatively be performed at step 22. The use and order of intermediate steps 14, 18, and 22 depends on a number of factors, such as operating environment, component dimensions, cost, and labor availability.

While the disclosed method and tackifier have been described for use with fiber plies 34 as the fiber preform structure, it should be understood that the method and tackifier can also be used on three-dimensional fiber structures. Such three-dimensional structures can be formed from woven, braided, needled, or stitched fibers, loosely-associated chopped fibers, and chopped-fiber or continuous-strand mats, to name a few, non-limiting examples. Three-dimensional structures can further be formed by joining together a plurality of individual three-dimensional structures of any combination, or any combination of one, two, and three-dimensional fiber structures.

The disclosed method produces CMCs with reduced porosity over CMCs produced using other methods. These enhanced CMCs have improved mechanical and thermal properties ideal for harsh operating environments like the hot section of a gas turbine engine. Other aerospace applications include exhaust systems, ducting, and external systems. The disclosed method can also be used to produce enhanced CMCs for maritime, power generation, and industrial applications.

Discussion of Possible Embodiments

The following are non-exclusive descriptions of possible embodiments of the present invention.

A method of producing an enhanced ceramic matrix composite includes applying a tackifier compound to a fiber preform. The tackifier compound includes inorganic filler particles. The method further includes modifying the tackifier compound such that the inorganic filler particles remain interspersed throughout the fiber preform, and occupy pores of the fiber preform.

The method of the preceding paragraph can optionally include, additionally and/or alternatively, any one or more of the following features, configurations and/or additional components:

The method can further include coating the fiber preform with an interface coating using a chemical vapor infiltration or chemical vapor deposition process.

Any of the above methods can further include forming a matrix surrounding the fiber preform using a chemical vapor infiltration or chemical vapor deposition process.

Any of the above methods can further include applying a thermal barrier coating or an environmental barrier coating to the ceramic matrix composite.

In any of the above methods, the tackifier compound can further include a solvent and a resin.

In any of the above methods, the solvent can include water, acetone, ethanol, isopropanol, or toluene.

In any of the above methods, the resin can include polyvinyl-alcohol, polyvinyl-styrene, or polyacrylate.

In any of the above methods, applying the tackifier compound can include a technique selected from the group consisting of spraying, painting, filming, dip-coating, and combinations thereof.

In any of the above methods, the inorganic filler particles can include a ceramic material or a preceramic polymer.

In any of the above methods, the ceramic material can be formed from a material selected from the group consisting of silicon carbide, silicon nitride, pure silicon, boron carbide, pure carbon, aluminum oxide, hafnia, and combinations thereof.

In any of the above methods, the preceramic polymer can be formed from a material selected from the group consisting of polycarbosilane, polycarbosiloxane, polycarbosilazane, polycarbodiimides, and combinations thereof.

In any of the above methods, modifying the tackifier compound can include a thermochemical decomposition technique or a crosslinking technique.

An enhanced ceramic matrix composite includes a fiber preform interspersed with inorganic filler particles, and a matrix formed over the fiber preform and the inorganic filler particles. The ceramic matrix composite has a porosity of less than 6%.

In the above composite, the inorganic filler particles can include spherical particles, chopped fibers, and combinations thereof.

In any of the above composites, the inorganic filler particles can be a ceramic material.

In any of the above composites, the ceramic can be formed from a material selected from the group consisting of silicon carbide, silicon nitride, pure silicon, boron carbide, pure carbon, aluminum oxide, hafnia, and combinations thereof.

In any of the above composites, the ceramic can be formed from a decomposed preceramic polymer, and the preceramic polymer can be formed from a material selected from the group consisting of polycarbosilane, polycarbosiloxane, polycarbosilazane, polycarbodiimides, and combinations thereof.

In any of the above composites, the inorganic filler particles can include spherical particles, elongated particles, and combinations thereof.

In any of the above composites, a diameter of the inorganic filler particles can range from 0.1 micrometer to 500 micrometers.

In any of the above composites, an aspect ratio of the inorganic filler particles can range from 1 to 100.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of producing a ceramic matrix composite, the method comprising:
    applying a tackifier compound to a fiber preform, the tackifier compound comprising:
        a solvent;
        a resin; and
        ceramic filler particles; and
    pyrolyzing the tackifier compound such that the solvent and the resin are burned off leaving only the ceramic filler particles interspersed throughout the fiber preform and occupying pores of the fiber preform.

2. The method of claim 1 and further comprising: coating the fiber preform with an interface coating using a chemical vapor infiltration or chemical vapor deposition process.

3. The method of claim 1 and further comprising: forming a matrix surrounding the fiber preform using a chemical vapor infiltration or chemical vapor deposition process.

4. The method of claim 3 and further comprising: applying a thermal barrier coating or an environmental barrier coating to the ceramic matrix composite.

5. The method of claim 1, wherein the solvent comprises water, acetone, ethanol, isopropanol, or toluene.

6. The method of claim 1, wherein the resin comprises polyvinyl-alcohol, a polymer of vinyl styrene, or polyacrylate.

7. The method of claim 1, wherein applying the tackifier compound comprises a technique selected from the group consisting of spraying, painting, filming, dip-coating, and combinations thereof.

8. The method of claim 1, wherein the ceramic filler particles are formed from a material selected from the group consisting of silicon carbide, silicon nitride, pure silicon, boron carbide, pure carbon, aluminum oxide, hafnia, and combinations thereof.

9. The method of claim 1, wherein the ceramic filler particles comprise spherical particles, elongated particles, and combinations thereof.

10. The method of claim 1, wherein a diameter of the ceramic filler particles ranges from 0.1 micrometer to 500 micrometers.

11. The method of claim 1, wherein an aspect ratio of the ceramic filler particles ranges from 1 to 100.

* * * * *